US005974443A

United States Patent [19]

Jeske

[11] Patent Number: 5,974,443

[45] Date of Patent: Oct. 26, 1999

[54] COMBINED INTERNET AND DATA ACCESS SYSTEM

[75] Inventor: Charles E. Jeske, Plano, Tex.

[73] Assignee: InterVoice Limited Partnership, Reno, Nev.

[21] Appl. No.: 08/938,092

[22] Filed: Sep. 26, 1997

[51] Int. Cl.[6] .............................. G06F 15/16; G06F 13/38

[52] U.S. Cl. .............................. 709/202; 709/217; 707/4; 707/10; 707/102

[58] Field of Search .............................. 705/35, 42, 44; 707/4, 10, 102; 395/200.47, 200.48, 200.49, 200.62; 709/217, 218, 219, 232

[56] References Cited

U.S. PATENT DOCUMENTS

| | | | |
|---|---|---|---|
| 5,668,986 | 9/1997 | Nilsen et al. | 707/10 |
| 5,745,754 | 4/1998 | Lagarde et al. | 707/104 |
| 5,752,246 | 5/1998 | Rogers et al. | 707/10 |
| 5,754,772 | 5/1998 | Leaf | 395/200.33 |
| 5,761,663 | 6/1998 | Lagarde et al. | 707/10 |
| 5,781,910 | 7/1998 | Gostanian et al. | 707/201 |
| 5,813,005 | 9/1998 | Tsuchida et al. | 707/10 |
| 5,826,261 | 10/1998 | Spencer | 707/5 |
| 5,859,972 | 1/1999 | Subramaniam et al. | 395/200.33 |

OTHER PUBLICATIONS

Internet: InterVoice Product Information—appeared on InterVoice's internet website in Jan., 1996.

*Primary Examiner*—Mark H. Rinehart
*Assistant Examiner*—Almari Romero
*Attorney, Agent, or Firm*—Fulbright & Jaworski L.L.P.

[57] ABSTRACT

The inventive system and method distributes information between databases and web servers, via a plurality of interconnected platforms or nodes. The invention includes a session manager, that is resident on only one platform and manages the information flow between the databases and the web servers. The invention also includes a plurality of data gateways, with at least one data gateway resident on each platform. The session manager uses a manager thread to determine which platform will operate on the request. A processing thread of the data gateway invokes an application module to create an application, which retrieves the requested information from the database. The processing thread translates the request into a format useable by the application. The processing thread retrieves a dynamic HTML template file and uses the information retrieved from the database to populate the HTML template file to form the response to the request, and passes the response onto the one global network server.

36 Claims, 3 Drawing Sheets

COMBINED INTERNET AND DATA ACCESS SYSTEM

TECHNICAL FIELD OF THE INVENTION

This application relates in general to internet communication links and in specific to communication links between an HTTP server and a computer agent platform.

BACKGROUND OF THE INVENTION

In existing technologies, access to information is typically provided to terminal devices such as telephones, fax machines, ADSI phones, and data modems, through the telephone network from information servers. The information servers could provide access to information stored in a database by using DTMF protocols, POSI protocols, voice, etc. Such systems include e-mail servers, fax servers, ADSI servers, voice servers, database servers and computer telephone integration (CTI) servers. As the Internet became prevalent, another method to distribute information emerged, which is the HTTP server. However, the information flow in HTTP servers is typically in HTML format, but may be in other formats such as JAVA, XTML, PDF, etc. These formats used by the HTTP server are different from the other types of servers. Moreover, HTTP servers have historically been stand-alone devices, in that they do not normally access information stored in other types of information storage devices. Consequently, there is a problem when the information that the HTTP server needs to distribute is not resident on the HTTP server, but is located on another type of server. Because of the difference in format and their stand-alone nature, HTTP servers have difficulty in accessing data stored in a non-HTTP oriented host. This problem is magnified for information distribution centers, which would often have more than one HTTP server to permit the response to a large volume of requests and/or information flow.

A prior art solution to this problem is that each type of server had to be connected to the HTTP server via a specific set of hardware and software, that would not work for the other types of servers. However, this solution is problematic in that it is inflexible because each type of server being connected to the HTTP server must be separately configured, as it is difficult for the HTTP server to access data on multiple information servers if they are all different from each other. Also, all of the processing involved with information retrieval from the other servers is performed by the HTTP web server, which is inefficient, as the delay time for sending responses to browser requests is increased. Moreover, such connections become unmanageable in trying to connect multiple HTTP web servers into the system.

Therefore, there is a need in the art to have an interface that allows the HTTP server to readily communicate with the other types of information servers, particularly for the HTTP web server have information requests routed to the other servers and for the HTTP server to receive responses from these servers. Moreover, there is a need in the art to have an interface system that is capable of connecting multiple HTTP web servers to multiple interface nodes.

SUMMARY OF THE INVENTION

These and other objects, features and technical advantages are achieved by a system and method that uses an access tool to interface the HTTP server with the other types of servers. Specifically, the access tool provides the access from the HTTP server to an agent platform that in turn is connected to the other servers. The access tool is connected between the web server and the agent platform. The access tool reformats information requests from the HTTP server into applications that retrieve the requested information from the proper database. The retrieved information is then merged into an HTML document and sent back to the web server for transmission across the Internet to the browser that originated the request.

Multiple web servers can be connected to multiple agent platforms to provide a multinodal information system. The multinodal system would use a session manager to monitor the different request sessions being handled by the system, as well as control which request is handled by which agent platform. The session manager is resident in one of the agent platforms.

The access tool provides the capability to have the same business logic or the same code running on an HTTP server, but also allows the system to utilize the same business logic to access hosts, databases, e-mail, CTI, or other data warehousing systems. Therefore, the same business logic that is running for Internet access, will also provide access through the telephone network.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DESCRIPTION OF THE PREFERRED EMBODIMENTS

Figure 1:
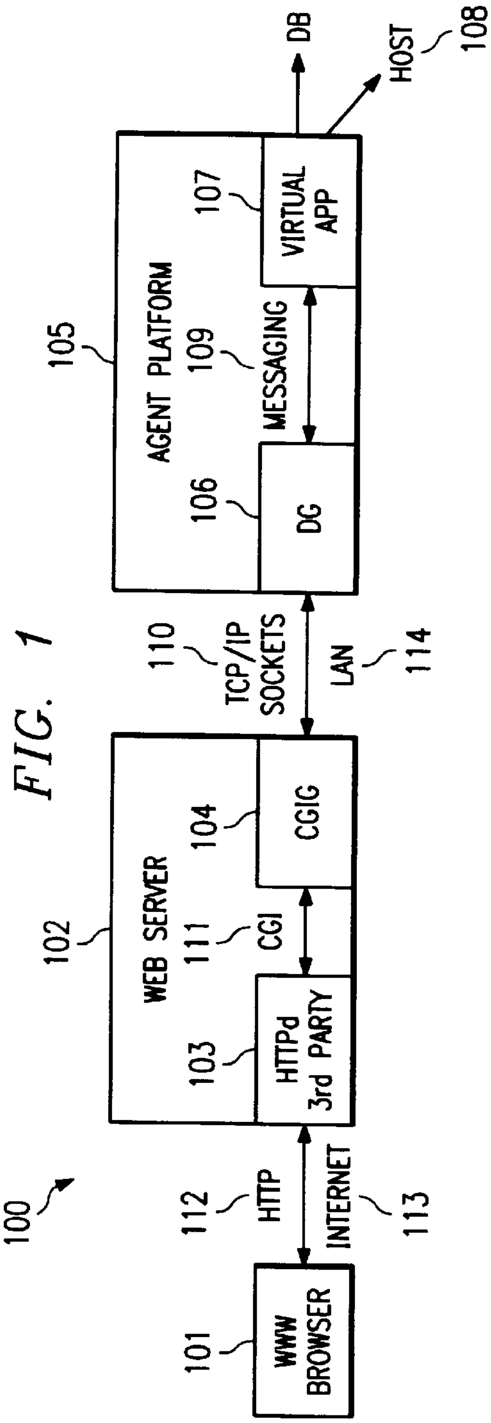
FIG. 1 depicts the inventive access tool connecting a browser to an agent platform.

The inventive access tool allows for dynamic information generation for web servers. The access tool is the communications link between a HyperText Transfer Protocol (HTTP) server and other types of servers, such as e-mail, host, main-frame, database or CTI servers. The access tool also links HTTP servers to standard telephone networks.

A user, via a browser 101, accesses the World Wide Web (WWW or Web) and sends a request for information. The access protocol used by the browser is HTTP 112, but a different protocol may be used. The means for transport of the data is the Internet 113. The different documents, media and network services on the Internet 113 are located by means of the Uniform Resource Locator (URL), which is a standardized method for addressing the contents of the Internet 113. The URL generated by the browser 101 is essentially an address to a specific document, media or service on the Internet 113. In other words, a browser's URL would point to a web server that defines a particular address. The HTTP request goes to web server 102. The web server 102 is typically a physical entity, e.g. a personal computer, that is running the web server software HTTPd 103.

An example of one method of communications in the system is to use the common gateway interface (CGI) 111. There are also other access methods, for example NSAPI (NetScape application programming interface) and ISAPI (Internet server application programming interface). Both of those are means to communicate between the web server software and another program or a dynamic link library (DLL). The preferred embodiment is to use CGI 111, which is an industry standard method of communicating between a web server and another program. HTTPd 103 initiates the CGIG process (common gateway interface gateway) 104, which is a program component that provides access to the agent platform 105. Note that more than one CGIG 104 can be running on the web server 102, with one CGIG per concurrent browser request. The agent platform or node is connected to the various servers such as e-mail, host, mainframe, and CTI. The web server provides information about the request that the browser made through the CGI interface 111. CGI uses pipes and environment variables on the web server 102 to get the information between the web server software and the CGIG process 104.

The information that the browser or the user might be trying to retrieve is an account balance, therefore, some information may be needed from the user, i.e., their account number or PIN number. All that information is transferred over the Internet to the web server and then through CGI to the system for processing. The CGIG 104 communicates to the agent platform via the TCP/IP sockets 110, over a physical connection such as a LAN 114. The process that is running on the agent platform or node 105, called a data gateway or DG 106. The data gateway process on the agent platform is waiting for requests from the CGIG 104. As soon as a request comes in, it translates the information that came over on the socket to postcards 109. Postcards messaging 109 is an InterVoice specific interprocess messaging communication method that provides the capability to send messages to other postcard messaging enabled entities. Note that this system would work with other interprocess messaging systems. Postcards provides a link between the data gateway and the virtual application 107.

Virtual application 107 is the business logic that interprets the request received from the browser and accesses the host or database servers. The host or database server is typically an external system 108. The application would access the host or the database server, retrieve the information that is required to process the request, and then send the response all the way back to the web browser 101. The virtual application 107 uses postcards 109 to pass the information back to data gateway 106, which uses sockets 110 to pass it to CGIG 104, and then CGIG 104 passes it to web server 102 and the web server sends the response information back to the browser.

The dynamic capability of this system is that the virtual application 107 defines an HTML template file. An HTML template file is an HTML document that has defined specific areas in the document that will be dynamically filled in. For example, there are places in the document that will contain account balances, dates, times, or names. These positions are clearly marked in the template file so that they can be populated by this dynamic data. The template file resides on the agent platform or node. Thus, any dynamic data that comes from the host or the database, is merged by data gateway 106 with the template file and then sent out back to the browser. For example, if there is a bank statement in the template file, and there is one line of the template file that is defined to state, "here is the date, here is the check number, here is who it went to, here is the item amount, and here is the balance afterwards." These items can be defined all as one line, and then the virtual application 107 would go and retrieve the information that is available for each item, even if each item is found in a different source or database. The data gateway would then merge all that information and form a response, based on the dynamic information that was retrieved.

The inventive system could also interface with a telephone system. The difference between telephone calls and Internet calls is the front-end logic that handles a telephone call would be a separate application, and written specifically for a telephone call. This is because a telephone call is different from HTML browsers request. A telephone call has a definite beginning and ending point. HTTP protocol is stateless, meaning that one request from a browser is completely independent of any other one. A browser, when it gets to a HTML page, will retrieve the document, and inside the document are references to possible images or other documents. The browsers would then go and make multiple requests for the different references. Those requests are not tied together in anyway, as one request is independent of the other. Thus, for session management, the access tool has the capability to define sessions.

Figure 4:
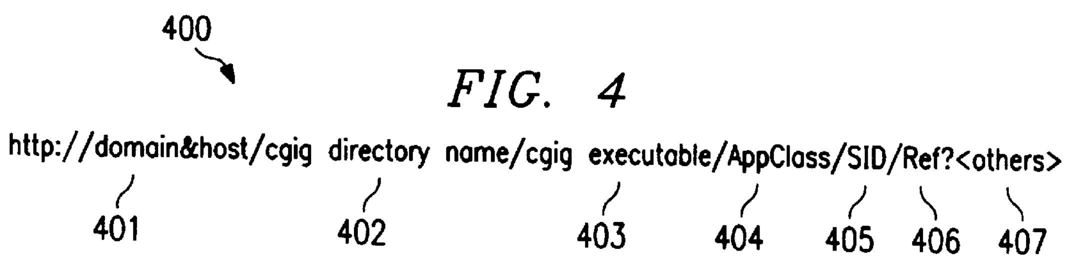
FIG. 4 depicts a URL used in the inventive access tool.

The uniform resource locator (URL) is a standardized way of addressing different documents, media, and network services on the Web, and describes where to send the user request from the web browser 101. The fields in the URL are used to define session information. This information is passed from the web browser 101 to the web server 102 and then on to the CGIG 104. FIG. 4 depicts a URL for the inventive access tool. The URL 400 has site specific information 401 which defines which domain protocol to use and the location of the host. The next field 402 defines the name of directory where the CGIG files are placed, and is specific to the type of web server 102 that is being used. The next field defines the name of the CGIG executable file 403, and is specific to the type of operating system being used. App class 404 is the name of the application directory. Since the agent platform 105 can have multiple applications, this allows a way to identify with which of the particular applications running in agent platform 105 that the browser 102 wants to communicate.

The next field is the session identifier 405, which is a key or a sequence of characters that are passed to each browser user when they log on. This key is used for transaction verification. Thus, everyone that logs on to a system using the access tool will receive a different session identifier. The session identifier can be used to store information about a particular user, as the system can use the session identifier as a key into a database to recall the information that user has accessed before. This would allow long session to be broken up into several smaller sessions. For example, if the session has a lengthy survey, then the session identifier could be used to allow the user to fill out the survey in pieces instead of all at the same session. The system can remember where the user left off and display it back to the browser when the user restarts the survey. Thus, the session comprises multiple requests from the browser 101. Each session would have at least one assigned virtual application, and include a respective processing thread for each request in the session. Note that a session could have just one virtual application, and if comprising two non-concurrent requests, the session would have two processing threads.

The next field is the application reference tag 406. Inside the application, there are usually multiple requests made in an application.

For example, if the browser is a banking application, a first request may be a log-on request, the second request may be to determine an account balance, the third request may be to pay a bill. The tag 406 defines the particular request or particular point in the application that the user desires. The last field is the optional field 407 which contains other URL encoded information, which can be used for passing information from one request to the next request.

The inventive access tool off-loads as much of the processing from the web server 102 to the agent platform as possible. This frees up the Web server to perform other tasks, such as serving up documents to other users. CGIG 104 relays the information in a request to the DG 106, which strips out all of the HTTP protocol encoding. The information, which comprises name-value pairs, is encapsulated in a message that states, "here is a request, here is all the name-value pairs, and process it." Name-value pairs are the field name and the field value of a request. HTML form defines name-value pairs and the CGIG 104 passes this information to the data gateway 106.

Figure 2:
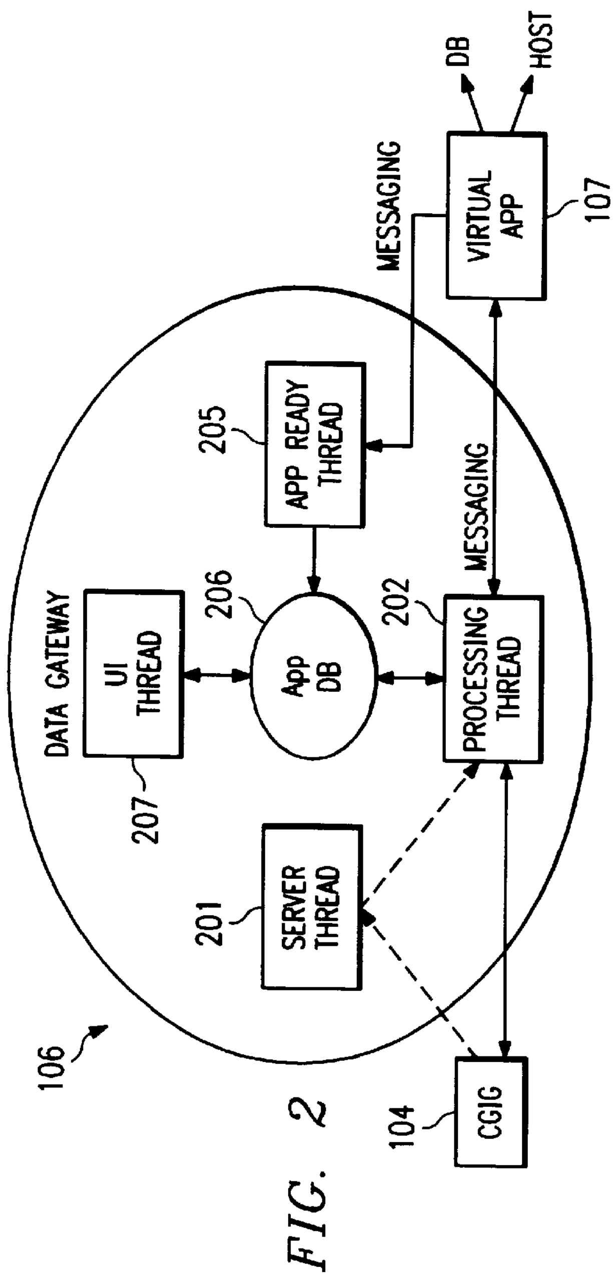
FIG. 2 depicts a schematic view of the data gateway of the inventive access tool.

FIG. 2 depicts the data gateway 106 of the access tool. The server thread 201 listens on the DG's TCP/IP port or socket. When a request comes in from the CGIG, the server thread passes the request to a new processing thread. Note that multiple processing threads can exist at the same time. After handing off the request to the processing thread, the server thread returns to listening on the port.

The processing thread 202 acts as a router, resource manager, and data converter. The processing thread 202 facilitates all of the communication between the CGIG process and the application. The processing thread routes the requests to the correct application, and it can manage multiple applications. Note that the applications already exist, are limited in number, and are designed to do specific tasks. The processing thread interprets the information, and then reads the name-value pairs. The named-value pairs are stored in the processing thread and sent to the application 107, in a specific order.

The specific order is important because the application 107 needs to understand the information it is receiving. Thus, the processing thread 202 converts the name-value pairs into ordered messages, using postcards. The name of each of the fields in the HTML form have a specific format. The format received by the DG 106 of the name of the name-value pair is X.Y.Z. X is the postcard number. As an application might receive several postcards, X is identifies each postcard. Y is the parameter number, that refers to a specific parameter, as there can be multiple parameters inside a postcard. For example, there might be five parameters in a postcard. Note that a single processing thread can handle multiple users, but not simultaneously. Z is the name of the field. It is used by the application programmer or developer, for example X.Y.pin_number.

The processing thread receives all of these name-value pairs and formats them into either a single postcard or multiple postcards, depending upon the name-value pairs, and sends them in the correct numbered order to the virtual application 107. The virtual application 107 then goes and communicates with the dynamic data sources 108, which are database servers or host system servers. Once the virtual application 107 has retrieved the information from the proper server, it reformats it into postcards again, and sends them back to the processing thread 202. Thus, the DG 106 uses the same postcard naming format, for information going to and from the virtual application 107.

The processing thread translates the postcards from the virtual application into an HTTP response. The processing thread performs the transformation by using a HTML template file. The format of the template file allows the creation of a HTML document with the information from the host/database servers. The HTML template file has a declaration block that defines the output fields in the template. The output fields are where the application data will be inserted. The input fields are part of the HTML form, for example part of the HTML specification. Entries in the declaration block have three attributes. The first is the tag. The tag marks the output field's location in the template file. Every reference of the tag will be replaced with data by the processing thread. The name attribute defines the order in which data is transferred between the virtual application and DG. The name attribute follows the X.Y.Z format as discussed above with respect to postcards. The type attribute defines the field type, either string or vlist. The string is an ASCII string, and the vlist is a vertical list, which is similar to a spreadsheet column.

Once the processing thread receives all of the information, the template file name and the dynamic data, the thread begins processing the information. It begins by retrieving the template file as a file name and opens the template file. It reads the declaration block to learn how much information to expect from the application. As stated above, the declaration block defines the postcard information, or the number of postcards and the number of parameters for each of the postcards, that it is going to receive. Thus, the processing thread can make sure that it has all the required information. Next, it reads the postcards and checks that everything is valid. The processing thread then merges the dynamic data from the postcards with the template to form a HTML file. This HTML file will then be sent over the LAN 114 using the TCP/IP sockets 110 back to the CGIG process 104. Then CGIG has a completely formatted HTML response, and all it needs to do is to send that the response through the web server 102 over the Internet 113 and to the browser 101. If the process on web server is a CGI process, it sends it out on the standard outpipe.

The remaining elements of FIG. 2 function as follows. The application ready thread 205 processes specific postcards from the virtual application, specifically the ready and session postcards. The ready postcard details when an application is available and ready to run, and is sent to the DG processing thread via the database 206. This postcard also provides a queuing method so that the system can cycle through the applications by noting which applications are queued up. The session postcard allows the attachment of an identifier, which is the URL identifier 405, to a particular processing thread.

The data gateway also has an application database 206, which is a repository for all of the information that DG needs to function. The database 206 stores information about which applications are available to run, what are their postcard addresses, etc. This allows the association of a request to an available executing application. The user interface thread 207 provides an interface to the outside world, so that system operators can provide and receive information from the DG. This thread also allows the operators to bring up and down the DG, and provides other interface capabilities.

Figure 3A:
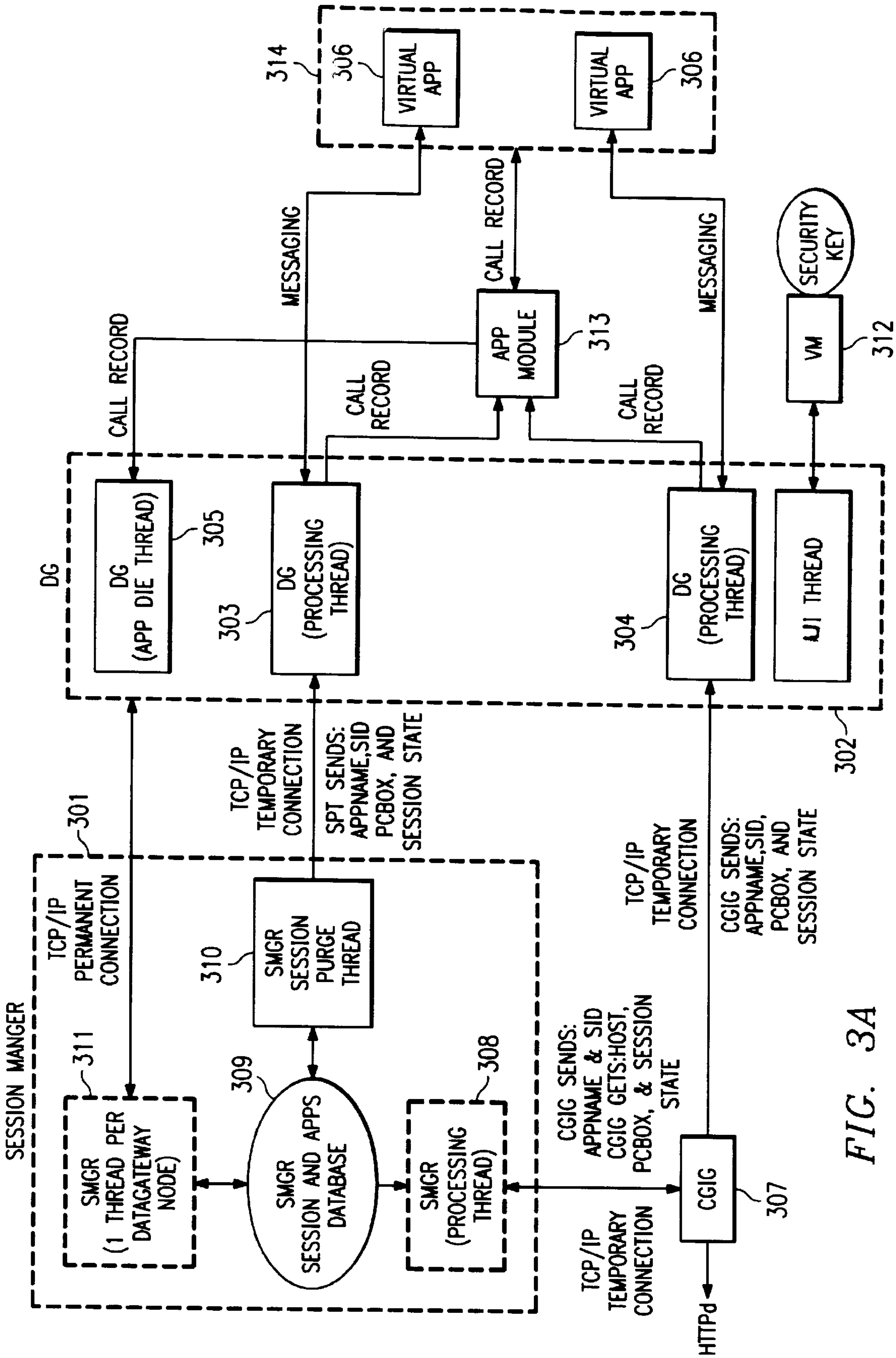
FIGS. 3A and 3B depict a multinodal implementation of the inventive access tool.
Figure 3B:
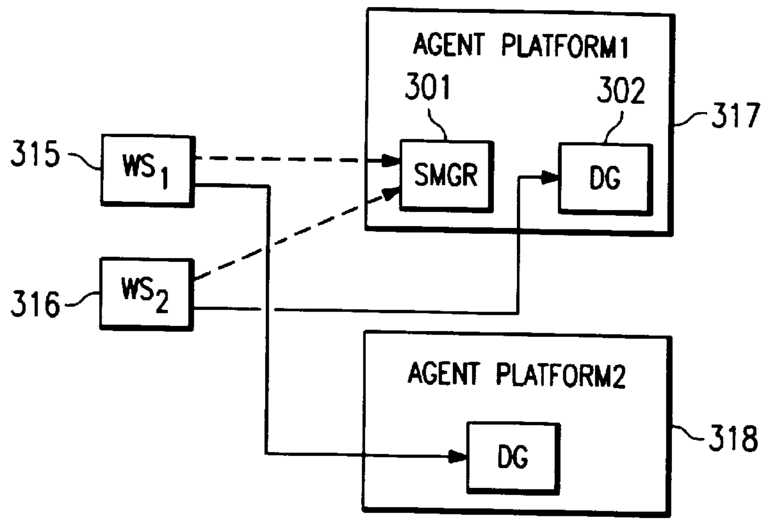

FIGS. 3A and 3B depict the multi-node capabilities of the access tool. FIG. 3A depicts the node or agent platform having the session manager. This arrangement allows multiple web servers to communicate with multiple agent platforms. The session manager 301 controls the activities of the access tool 300. There is only one session manager 301 per system and it resides on one of nodes or agent platforms. Data gateway 302 is similar to DG 106, and contains the elements depicted in FIG. 2, although they may not be depicted in FIG. 3A. Note that there is one data gateway 302 per agent platform 317, and there are multiple agent platforms 317, 318 per system. The two processing threads, 303 and 304, are similar to processing thread 202, in their functionality and capabilities. Voice Manager or VM 312 limits the number of concurrent requests per agent platform that can be operating at a time. The attached security key allows only authorized personnel to change the number stored in VM 312. Application die thread 305 tracks the termination of an application once its associated processing thread no longer needs the application 306. Termination could transpire by the completion of a session, timeout of a session, process error, etc. The application 306 is similar to the application 107. The virtual applications 306 are started or dynamically generated as requests come in, which means that the application does not have to exist before the request comes in. Thus, this allows for the more efficient use of system resources.

After the node 318 is selected to handle the request from web server-A 315, then subsequent requests from the web server-A 315, via CGIG 307, may be sent to node 318. The requests may also be sent to node 317, if the session manager determines that the node 317 is better able to handle the requests. When web server-B sends in a request, via CGIG 307, the session manager will decide which node will handle it. As shown in FIG. 3B, the session manager has decided that node 317 will handle the request from web server B 316. The session manager can pass on all overflow requests to the other nodes. Thus, session manager 301 distributes the request load across the different nodes that are available in the system.

Processing threads 303 and 304 communicate with application module 313, via a specific postcard termed a call record, which contains specific information relative to the execution of an application, including the application name, status, call duration, etc. A call record triggers the application module 313 to start an application 306. It communicates with the virtual application module 314 and tells it to create a particular application 306. The application module 313 stores information about the different types of applications, and depending upon the call record, will create a particular application to handle a particular request. After it has been created, then the virtual application 306 will begin communication with the processing thread 303, in a manner similar to that shown in FIG. 2. The information is transmitted between the processing thread 303 and the virtual application 306 is similar to that between 202 and 107. The information is in the postcards format.

CGIG 307 is similar in functionality and capabilities to CGIG 104. CGIG 307 communicate with the session manager 301, to determine where to send the requests received from the browser 101 via the web servers 315, 316. When a request comes in from one of the web servers 315, 316 the CGIG 307 will communicate with the session manager processing thread 308 to determine where the application should be run. The session manager processing thread 308 listens on the DG's TCP/IP port or socket. There may be several different nodes 317, 318 that are available, so the session manager processing thread 308 will consult database 309, to determine which nodes are available, which applications are currently executing on each of the nodes, which applications are available to run on those nodes (not every application may be run on every node), and any other information that is required to make a decision. For example, the session manager may decide that a particular node is the best because of a distribution algorithm, such as first available. Once the node is chosen, the session manager sends that information to CGIG 307. The CGIG 307 connects with the data gateway 302, as in FIG. 2.

The session purge thread 310 cancels sessions that are timed out. Since there are multiple nodes, and requests for a particular session can go to any node, then the session manager has to track the sessions to ensure their completion. If one of the sessions times out, i.e. exceeds a predetermined wait time, then purge thread 310 will close the session by sending a session timeout notice to an application, which will initiate whatever clean up is necessary to end that session, for example, removing entries in a database or closing a host connection. The application associated with the session will then self-terminate. The application die thread 305 would then receive notification that the application has terminated. This conserves the system resources. If the browser that initiated the session tries to continue, a new processing thread will be selected from a pool of available threads, and will contain information about the previous session that is stored in the database 309. The session purge thread 310, upon determining that a session has timed out, will make a termination request. Note that the purge thread 310 only operates for session time outs, applications that have completed their tasks self-terminate upon sending a response back to the CGIG 307.

Session manager monitoring thread 311 is established for each of the different data gateway nodes of the system. This thread monitors the operation of the different nodes and notifies the session manager if a particular node is down. Thus, the session manager will no longer assign requests to the down node, and will initiate a recovery mechanism to assign any pending requests on the down node to the remaining nodes. New processing threads would be selected from a pool of available threads, and would contain the data stored in the database 309. The processing threads would spawn new virtual applications 306 in the remaining nodes, to retrieve the information necessary to form responses to the pending request. Thus, this system is fault tolerant, except that if the node housing the session manager goes down, then the entire system will go down.

Although the present invention and its advantages have been described in detail, it should be understood that various changes, substitutions and alterations can be made herein without departing from the spirit and scope of the invention as defined by the appended claims.

What is claimed is:

1. A system for distributing information between at least one database and at least one global network server, the system comprising:

a plurality of platforms, each connected between one or more databases and one or more global network servers;

a session manager, resident on only one platform of the plurality of platforms, for managing information flow between the at least one database and the at least one global network server; and a plurality of data gateways, with at least one data gateway resident on each platform of the plurality of platforms, for reformatting an information request received from the at least one global network server, passing the reformatted information request onto the at least one database, reformatting a response from the at least one database, and passing the reformatted response onto the at least one global network server.

2. The system of claim 1, further comprising:

means for limiting a number of requests that each platform can have active at a time.

3. The system of claim 1, wherein the session manager comprises:

a manager thread for determining which of the plurality of platforms will operate on the request for information and be designated as an operating platform.

4. The system of claim 3, wherein the session manager further comprises:

a database for maintaining information about status of the plurality of platforms, types of requests that each platform is capable of handling, and information about each request that is currently operating on each platform;

wherein the manager thread consults the database in determining which of the plurality of platforms will operate on the request for information.

5. The system of claim 3, wherein:

the manager thread is temporarily connected to the at least one global network server.

6. The system of claim 1, wherein the session manager comprises:

a purge thread for canceling a session which includes the request, that has exceeded a predetermined idle time period.

7. The system of claim 1, wherein the session manager comprises:

platform thread for monitoring operational status of each of the platforms of the plurality of platforms, wherein said platform thread notifies said session manager about the operational status of a data gateway resident on any platform.

8. The system of claim 1, wherein:

said at least one database is a plurality of databases, each of which is connected to each platform of the plurality of platforms.

9. The system of claim 1, wherein:

said at least one global network server is a plurality of global network servers, each of which is connected to each platform of the plurality of platforms; and the session manager manages the information flow between at least one database and each global network server of the plurality of global network servers.

10. The system of claim 3, wherein:

the at least one global network server connects with said designated operating platform, and passes the request for information to the at least one data gateway resident on said designated operating platform.

11. The system of claim 10, further comprising:

an application module for creating an application based on the request, wherein the application accesses the at least one database and retrieves the information.

12. The system of claim 11, wherein the at least one data gateway resident on the operating platform comprises:

a processing thread that receives the request from the at least one global server and invokes the application module.

13. The system of claim 12, wherein:

the processing thread translates the request into a format useable by the application.

14. The system of claim 13, wherein:

the processing thread resident on the at least one data gateway of said designated operating platform retrieves a dynamic template file and uses the information retrieved from the at least one database to populate the template file to form the response, and passes the response onto the at least one global network server.

15. The system of claim 14, wherein:

the template file is an HTML template file.

16. The system of claim 11, wherein the at least one data gateway resident on the operating platform comprises:

an application die thread that tracks a status of the application and informs the session manager when the application is terminated.

17. The system of claim 11, wherein:

the application self-terminates upon satisfaction of the request.

18. A method for distributing information between at least one database and at least one global network server, with a plurality of platforms, each platform interconnected between one or more databases and one or more global network servers, one session manager that is resident on any one platform of the plurality of platforms, and a plurality of data gateways, with at least one data gateway resident on each platform of the plurality of platforms, the method comprising the steps of:

receiving an information request from at least one global network server;

determining, by said one session manager, which of the plurality of platforms will operate on the request for information and be designated as an operating platform;

routing the request to the operating platform;

reformatting, by the at least one data gateway resident on the operating platform, the request received from the at least one global network server;

passing, by the at least one data gateway resident on the operating platform, the reformatted information request onto the at least one database;

reformatting, by the at least one data gateway resident on the operating platform, a response from the at least one database;

passing, by the at least one data gateway resident on the operating platform, the reformatted response onto the at least one global network server; and managing, by the session manager, information flow between the at least one database and the at least one global network server.

19. The method of claim 18, further comprising the step of: limiting a number of requests that can be active at a time.

20. The method of claim 18, furthering the steps of:

maintaining information about status of the plurality of platforms, types of requests that each platform is capable of handling, and information about each request that is currently operating on each platform; and using the maintained information in the step of determining which of the plurality of platforms will operate on the request for information.

21. The method of claim 18, further comprising the step of:

canceling a session which includes the request, that has exceeded a predetermined idle time period.

22. The method of claim 18, wherein the determining step further comprises the step of:

monitoring operational status of each of the platforms of the plurality of platforms; and notifying said session manager about the operational status of a data gateway resident on any platform.

23. The method of claim 18, wherein:

said at least one database is a plurality of databases, each of which is connected to each platform of the plurality of platforms.

24. The method of claim 18, wherein said at least one global network server is a plurality of global network servers, each of which is connected to each platform of the plurality of platforms, and the method further comprises the step of:

managing, by the session manager, the information flow between at least one database and each global network server of the plurality of global network servers.

25. The method of claim 18, further comprising the steps of:

connecting the at least one global network server with said operating platform; and passing the request for information to the at least one data gateway resident on the operating platform.

26. The method of claim 25, further comprising the steps of:

creating, by an application module, an application based on the request; and accessing, by the application, the at least one database and retrieving the information.

27. The method of claim 26, further comprising the steps of:

receiving, by a processing thread resident on the at least one data gateway of the operating platform, the request from the at least one global server; and invoking, by the processing thread, the application module.

28. The method of claim 27, further comprising the step of:

translating, by the processing thread, the request into a format useable by the application.

29. The method of claim 28, further comprising the steps of:

retrieving, by the processing thread, a dynamic template file;

populating, by the processing thread, the template file with the information retrieved from the at least one database to form the response; and passing, by the processing thread, the response onto the at least one global network server.

30. The method of claim 29, wherein:

the template file is an HTML template file.

31. The method of claim 26, further comprising the steps of:

tracking, by an application die thread that is resident on the at least one data gateway of the operating platform, a status of the application; and informing, by the application die thread, the session manager when the application is terminated.

32. The method of claim 26, further comprising the step of:

terminating the application upon satisfaction of the request.

33. The system of claim 2, wherein said limiting number of requests is adjustable.

34. The system of claim 2, wherein said means for limiting further comprises:

a security key to control access to said means to allow only authorized personnel to change said limiting number.

35. The system of claim 14, wherein the template file comprises a declaration block, wherein said declaration block defines at least one output field.

36. The system of claim 35, wherein said at least one output field has an associated tag, wherein every reference of said associated tag is replaced with data retrieved by said processing thread.

* * * * *